T. FAWCUS.
GEAR CUTTER.
APPLICATION FILED JAN. 9, 1913.
1,096,164.
Patented May 12, 1914.
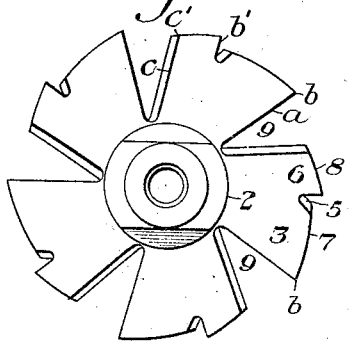
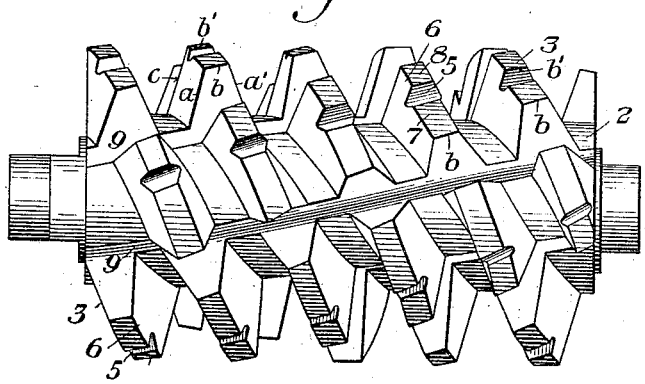
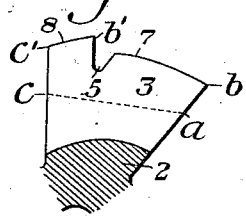
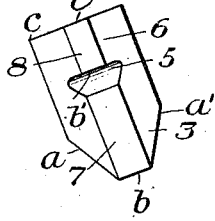
WITNESSES
R. A. Balderson
A. T. McCorvin
INVENTOR
Thomas Fawcus
by Bakewell, Byrnes & Parmelee,
Attys.

UNITED STATES PATENT OFFICE.

THOMAS FAWCUS, OF PITTSBURGH, PENNSYLVANIA.

GEAR-CUTTER.

1,096,164.  Specification of Letters Patent.  Patented May 12, 1914.

Continuation in part of application Serial No. 713,556, filed August 6, 1912. This application filed January 9, 1913. Serial No. 740,926.

*To all whom it may concern:*

Be it known that I, THOMAS FAWCUS, a citizen of the United States, residing at Pittsburgh, in the county of Allegheny and State of Pennsylvania, have invented a new and useful Improvement in Gear-Cutters, of which the following is a full, clear, and exact description, reference being had to the accompanying drawings, forming part of this specification, in which—

Figure 1 is an end view of a cutter embodying my invention; Fig. 2 is a plan view of the same; Fig. 3 is a detail sectional view showing one of the cutting teeth in elevation; and Fig. 4 is a plan view of one of the teeth. Fig. 5 is a view similar to Fig. 3, but showing a modified form of cutting tooth.

The present application is in part for subject matter disclosed but not claimed in my co-pending application Serial No. 713,556, filed August 6th, 1912.

My invention has relation to gear cutters, and more particularly to that class of cutters commonly known as hobs, which are employed in the manufacture of helical gears and the like, and which have the sides and points of their teeth backed off or relieved in such a way as to maintain the required shape of cutting tooth to produce the required shape of hub as the teeth are ground back.

This invention is particularly applicable to hobs used for generating both spur and helical gears, as in such work by far the greater portion of the metal is removed from the blank by the points or peripheral cutting edges, and very little by the sides, the latter in fact nearly forming the proper curvature of the sides of the gear teeth. It is, therefore, obvious that by increasing the number of peripheral cutting edges the speed of the cutter will be proportionately increased. If, however, the number of teeth in the cutter is also correspondingly increased they will be weakened so that the speed cannot be maintained without great risk of breaking the cutters.

My invention provides for increasing the number of peripheral cutting points while maintaining the strength and number of teeth in the cutter, and whereby with a hob of given diameter the number of cutting edges may be doubled. I accomplish this by forming the hob or cutter with the usual number of teeth, and then forming an extra cutting edge on the periphery of each tooth. These secondary cutting edges are only adapted to cut between the outer edges of the cuts of the main teeth.

Referring to the accompanying drawings, in which I have shown one form of hob embodying my invention, the numeral 2 designates the body of the hob, which is formed with the helically arranged cutting teeth 3, each of which has a cutting edge $b$. These cutting teeth are, in general, of the usual form, shape and arrangement; but in accordance with my invention I shape the periphery of each tooth as by a notch 5, or in any other suitable manner to give the tooth an additional peripheral cutting edge $b'$ which is of the same radius as the cutting edge $b$. As this additional cutting edge is located at a point well toward the rear of the tooth, it is somewhat narrower than the main cutting edge, as will be clearly seen by reference to Fig. 4. This is because of the side relief between points $a$ and $c$ hereinafter described, and which results in narrowing the peripheral edges of the teeth from their point to their rear edges. Each cutting edge is backed off as indicated at 7 and 8 respectively to provide clearance. Each tooth has two cutting side-edges $a$, $a'$ and two or more peripheral cutting edges $b$, $b'$. The side edges are relieved gradually from $a$ to $c$ and the peripheral edges are relieved from $b$ to the notch 5 and again from the notch 5 to $c'$. The points $b$ and $b'$ are the same radial distance from the center of the cutter. It will, of course, be understood that I may form more than one of the additional cutting edges on each tooth, particularly on hobs for cutting large pitches. This is illustrated in Fig. 5, in which I have shown a tooth having three cutting edges $c$, $c'$ and $c^2$. By the provision of these additional peripheral cutting edges, it will be seen that the number of cutting edges may be doubled with a hob of a given diameter length. In this manner, the cutting work of each of the edges is largely reduced, or the speed of the feed of the cutters can be increased without increasing the proportion of metal removed by each cutting edge.

The hob may be formed as follows:—The blank is first turned up in the form of a screw; and after it has been turned grooves 9 are milled therein in a general longitudinal direction and at approximately right angles to the helical threads of the hobs. The milling of these grooves forms the cutting faces of the main cutters. The sides of the teeth are then backed off in the usual manner in order to provide proper clearance. The peripheries of the teeth are then machined to form the cutting faces for the secondary teeth 6. The periphery of the cutter is then backed off to form the clearances 7 and 8.

My invention is not limited to the particular form of cutter as herein shown and described, since it may be applied to other forms.

What I claim is:—

1. A hob having a plurality of cutting teeth arranged in helical lines, at least some of said teeth having a plurality of peripheral cutting edges, said cutting edges being of the same radial distance from the center of the hob but of different widths, and each tooth having a continuous side relief extending from the front to the rear edge of the tooth; substantially as described.

2. A gear cutter having a cutting tooth provided with a plurality of peripheral cutting edges, and a continuous side relief extending from the front to the rear edge of the tooth; substantially as described.

3. A gear cutter having a plurality of teeth, each of said teeth having two side cutting edges, and a plurality of peripherally arranged cutting edges each tooth also having a continuous side relief extending from the front to the rear edge of the tooth, substantially as described.

4. A hob having a plurality of cutting teeth arranged in helical lines, each of said teeth having a plurality of peripheral cutting edges, and a continuous side relief extending from the front to the rear of the tooth, substantially as described.

In testimony whereof, I have hereunto set my hand.

THOMAS FAWCUS.

Witnesses:
H. M. CORWIN,
GEO. H. PARMELEE.